United States Patent
Jardin et al.

[11] Patent Number: 5,810,429
[45] Date of Patent: Sep. 22, 1998

[54] VEHICLE ROOF

[75] Inventors: Hans Jardin, Inning-Bachern; Werner Paetz, Zittau, both of Germany

[73] Assignee: Webasto Systemkomponenten GmbH, Stodkdorf, Germany

[21] Appl. No.: 622,292

[22] Filed: Mar. 25, 1996

[30] Foreign Application Priority Data

Mar. 25, 1995 [DE] Germany .................. 195 11 067.6

[51] Int. Cl.$^6$ ........................................ B60J 7/05
[52] U.S. Cl. .................. 296/214; 296/213; 454/129; 454/149; 49/63
[58] Field of Search ................. 296/214, 213, 296/215, 216; 49/51, 63; 454/129, 94, 136, 137, 149, 115, 275, 138

[56] References Cited

U.S. PATENT DOCUMENTS

| | | | |
|---|---|---|---|
| 1,059,157 | 4/1913 | Henry | 454/136 X |
| 1,550,503 | 8/1925 | Coffman | 454/136 |
| 2,839,986 | 6/1958 | Herman | 454/136 |
| 4,312,533 | 1/1982 | Jardin et al. | 296/214 |
| 4,320,921 | 3/1982 | Schatzler | 296/213 |
| 4,337,975 | 7/1982 | Tamamushi et al. | 296/215 |
| 4,671,564 | 6/1987 | Sumida et al. | 296/214 |
| 4,717,200 | 1/1988 | Kruger | 296/214 |
| 5,149,170 | 9/1992 | Matsubara et al. | 296/214 X |
| 5,328,405 | 7/1994 | Jarnot | 454/275 X |

FOREIGN PATENT DOCUMENTS

| | | | |
|---|---|---|---|
| 409295 | 1/1991 | European Pat. Off. | 296/214 |
| 713106 | 1/1941 | Germany . | |
| 3000280 | 7/1981 | Germany | 296/214 |
| 3930054 | 3/1991 | Germany | 296/216 |
| 1632804 | 3/1991 | U.S.S.R. | 454/136 |
| 9119617 | 12/1991 | WIPO | 296/216 |

*Primary Examiner*—Dennis H. Pedder
*Attorney, Agent, or Firm*—Sixbey, Friedman, Leedom & Ferguson; David S. Safran

[57] ABSTRACT

A vehicle roof (1) having a cover (3) which, selectively, can close or at least partially expose a roof opening (2). A liner (6) which is made of a waterproof transparent material is slidably arranged below the cover (3). Contrary to a known design, in which the transparent liner, in combination with an opaque cover, does offer a variety of options regarding light transmission of the entire vehicle roof, the vehicle roof of the present invention provides an additional ventilation possibility, in that the liner (6) has ventilation openings (21) which are designed to prevent water penetration. The ventilation openings, preferably, have rearward facing slots (23) and can selectively be exposed or closed by way of movable parts (24).

12 Claims, 3 Drawing Sheets

VEHICLE ROOF

BACKGROUND OF THE INVENTION

1. Field of the Invention

The invention relates to a vehicle roof having a cover, which selectively closes, or at least partially, exposes a roof opening, and further has a liner slidably disposed below the cover, the liner being formed of a waterproof, transparent material.

2. Description of Related Art

A vehicle roof of the initially mentioned type is known from German patent No. 713,106. The translucent sliding panel described therein is arranged below a non-translucent sliding roof cover. While it is suitable to cover the exposed roof opening with a transparent, waterproof sliding panel when the cover is opened, and thereby providing an upward view, such a panel does not, however, provide the possibility for ventilating of the passenger compartment of the vehicle via the roof opening, while simultaneously providing a waterproof covering thereof.

Ventilation openings provided in liners of vehicle roofs are known, for instance, from U.S. Pat. No. 4,320,921; however, up to now, such openings have never been provided in combination with a transparent liner consisting of a waterproof material. Accordingly, in that reference, no prior inventive development has been provided for preventing of water seepage through such ventilation openings.

A device for the positive exposure of ventilation slots provided in a liner, when there is an extension movement of a movable roof cover, is known from European patent 0 150 0470 and corresponding U.S. Pat. No. 4,312,533.

SUMMARY OF THE INVENTION

The present invention has a primary object of providing a vehicle roof in which a roof opening can be selectively covered and uncovered by an opaque cover, or by a transparent waterproof liner, and in which, additionally, even when there is a waterproof covering, there are a variety of options for ventilating the interior passenger compartment of the vehicle.

This object is achieved by providing the waterproof liner with ventilation openings which are designed as to prevent the penetration of water.

The fact that the liner has ventilation openings which are designed to prevent water penetration, provides the passengers of a vehicle equipped with such a roof with a high degree of flexibility for adapting the roof to ambient conditions. For instance, if wintery conditions prevail, both the cover, as well as the liner, can be closed, resulting in a tight closure of the roof with good heat insulation. However, there is also the option of raising the roof cover at its rear edge in the conventional manner of a sliding-lifting roof, whereby the ventilation openings in the liner then provide a draft-free, additional ventilation option for the inside compartment. Another option is to drive the rigid sliding cover rearwardly below the fixed roof skin while keeping the liner closed, which provides an unobstructed upward view, with additional ventilation possible via the ventilation openings, arranged in the liner. Further yet, there is the option of opening the liner partially or completely, independent of the cover position whereby, with the cover and liner completely opened, there is a resultant unobstructed upward view with a corresponding large ventilation opening.

An increase in the variety of options for ventilation of the interior compartment is due to the fact that the ventilation openings can be closed by movable parts, like sliders. Actuating ease is further enhanced in that the movable parts can be positively actuated when the cover is shifted in an opening direction, i.e., they can be coupled for movement with the lifting movement of the cover's rear edge so as to, for instance, at least partially expose the ventilation openings. This, as a rule, corresponds to the operator's desire during cover extension, for an increased air flow rate. It is advantageous, in order to reduce the effort required for such a positive actuation of the movable parts, to have it produced by a drive of the cover.

A further increase of driving comfort is obtained when a vehicle roof is equipped with a means for positive opening of the liner, and there is a manually actuated coupling between the movable parts and the cover drive to facilitate switch-on and switch-off of the positive actuation. This enables the operator to determine, whether or not, he wants to avail himself of the automatic exposure of the ventilation slots during the lifting movement.

It is advantageous for optical and functional reasons when the means for opening or closing of the ventilation openings are arranged above the liner. Alternatively, or supplementally thereto, it is advantageous when the means for opening or closing of the ventilation openings extend, at least partially, into the ventilation openings. This yields a dual benefit in that the ventilation openings can be utilized for the passage of air, as well as for the passage of part of the actuating means. Accordingly, the moveable parts for opening and closing of the ventilation openings can be operated from the underside of the liner even though disposed thereabove. Guidance to the upper cover surface of the liner, however, occurs in an area which is designed from the onset to securely prevent the penetration of water.

In accordance with one advantageous embodiment, the ventilation openings are formed by slots, whose lower edge is arranged above the upper cover area of the liner. A particularly draft-free design is obtained when the slots, relative to the driving direction, are open to the rear. Advantageously, such slots are covered up from above to avoid penetration of even the smallest water droplets.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
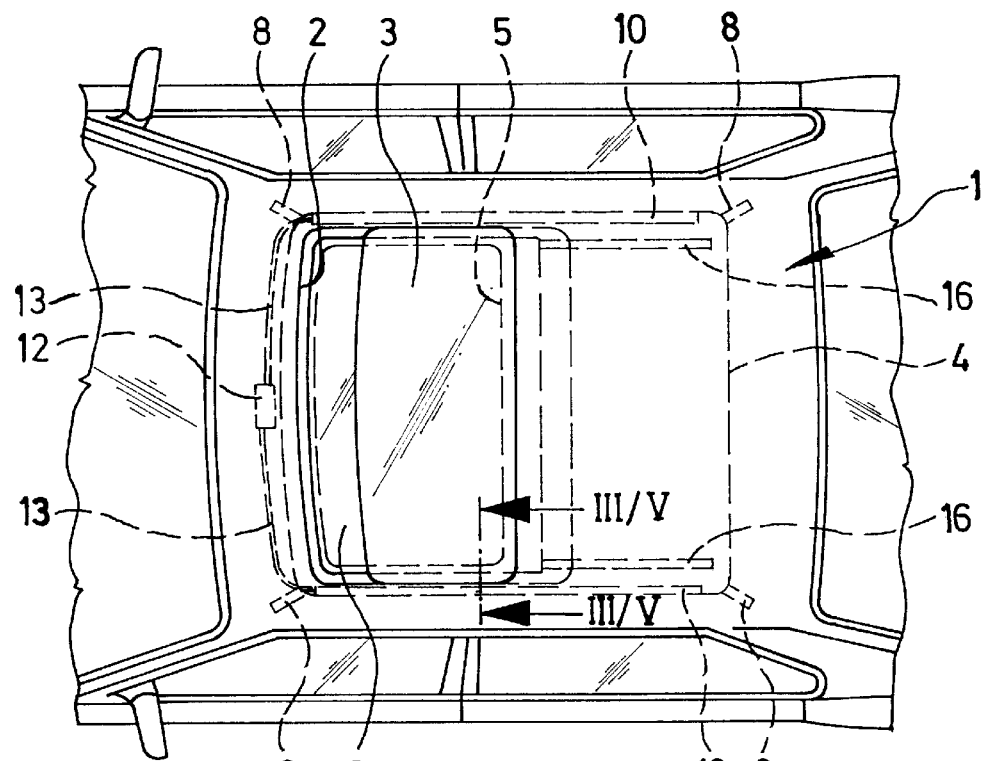
FIG. 1 is a schematic top view of a vehicle roof.
Figure 2:
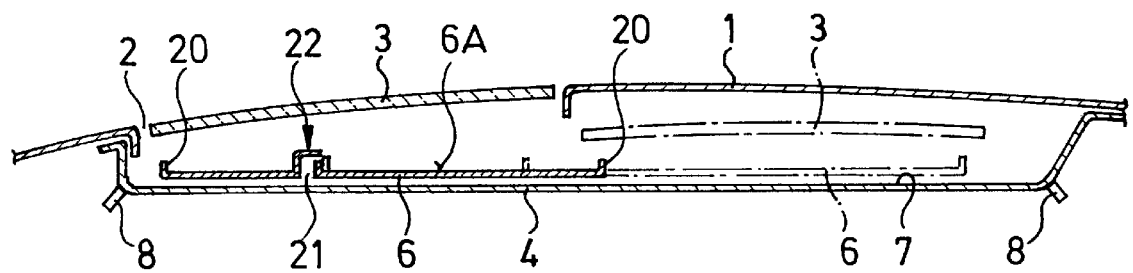
FIG. 2 is a schematic longitudinal cross section through the vehicle roof of FIG. 1.

A vehicle roof, designated as a whole with reference numeral 1, has a roof opening 2, which can be selectively closed, or at least partially exposed, by means of a movable cover 3. To this end, cover 3 is movable carried on a roof frame 4 by means of a mechanical device which causes cover 3 to execute the usual functions of a sliding-lifting roof, such as the lifting of the rear edge into a ventilating position, and the lowering of the rear edge of the cover, with subsequent sliding thereof below the fixed roof skin of the vehicle. This last-mentioned position, which is a completely open position, is indicated in FIG. 2 by dash-dotted lines.

The roof frame 4 defines a frame opening 5 whose dimensions are somewhat smaller than those of roof opening 2. Roof opening 5 can be selectively closed, or at least partially exposed, by way of a headliner 6, which is longitudinally slidable below cover 3. Movement of headliner 6 is manually produced from the inside of the vehicle, independent of any movement of cover 3.

While cover 3, preferably, is a solar cover with integrated crystalline solar cells, and therefore, is not transparent, liner 6 is made of a transparent material, which, additionally, is water-proof, like glass, or a suitable synthetic plastic material. This facilitates, with cover 3 at least partially open, collection by liner 6 of any rain water penetrating from above on its upper surface 6A. Water collected by liner 6 is passed to laterally extending gutters 7, which are connected with roof frame 4 or are integrated therein. Gutters 7 are connected with drain pipes 8 at the four corners of roof frame 4, and run-off hoses are connected to the drain pipes 8 and are installed within the A or C columns inside the vehicle. The gutters 7 are exteriorly defined by side wall 9, which, advantageously, is formed directly by roof frame 4.

Also, longitudinally extending along both sides of roof frame 4 are guide rails 10, which serve to guide slide members 11, which have a mechanical device for moving cover 3 pivotally connected thereto. This cover movement mechanism can be actuated by way of drive 12, disposed in the front area of roof frame 4. Drive 12 can be a manual or an electrical drive, and is connected with the rear slide elements 11 via drive cable 13. A movement of the rear slide elements 11 by means of drive cable 13, thus induces cover 3 to execute the pivotal or sliding movements via lever 14 to effect the opening of cover 3. In this regard, it is noted that the actual cover lifting-lowering movement mechanism, itself, forms no part of this invention, and it can be of any known design.

Additionally, a headliner guide track 16 is provided on the roof frame 4, in the present case, within gutter 7. Guide track 16 serves to guide slide shoes 17, which are attached to a support 18 that is connected with headliner 6. As can be seen from FIG. 3, liner 6 extends laterally outwardly over and beyond headliner guide 16, so as to ensure a complete passage of the water into gutter 7.

As can be seen from FIG. 2, the upper surface 6A of liner 6 has upwardly projecting end flanges 20 at its front and rear edges to prevent a forward or rearward water flow off of the liner 6. As can further be seen from FIG. 2, liner 6 can be completely slid rearwardly below the fixed vehicle roof 1, independent of the position of cover 3. If cover 3 is completely opened into the depicted dash-dotted position, roof opening 2 and frame opening 5 are, simultaneously, completely exposed, permitting an upward view, and facilitating ventilation across a large area.

In order to improve the ventilation of the vehicle interior, even when liner 6 is closed, liner 6 is provided with one, or preferably, with several ventilation openings 21. These are designed in a manner as to prevent water seepage in every instance, even when cover 3 is in the open position. To this end, the liner 6 has a scoop member 22 vertically encircling each of the ventilation openings 21. The scoop member 22, preferably, is directly formed by the material of liner 6, and surrounds ventilation openings 21 via side wails 22A, a rear wall 22B, and an upper cover wall 22C. It is only to the rear, relative to the drive direction, that scoop member 22 exposes slots 23, which serve as a horizontal continuation of the vertically facing ventilation opening 21. Slot 23 is formed in the scoop member 22 above a front wall 22D whose upper edge projects above the upper surface 6A of liner 6, thus preventing penetration of water into the ventilation opening 21, even when slot 23 is open.

In accordance with a simple embodiment, liner 6 has several such scoop members 22 having slots 23 which are always open, and, accordingly, are effective for improved ventilation of the inside compartment. Regulation of the air-flow rate is possible via a variable partial opening of cover 3.

Figure 3:
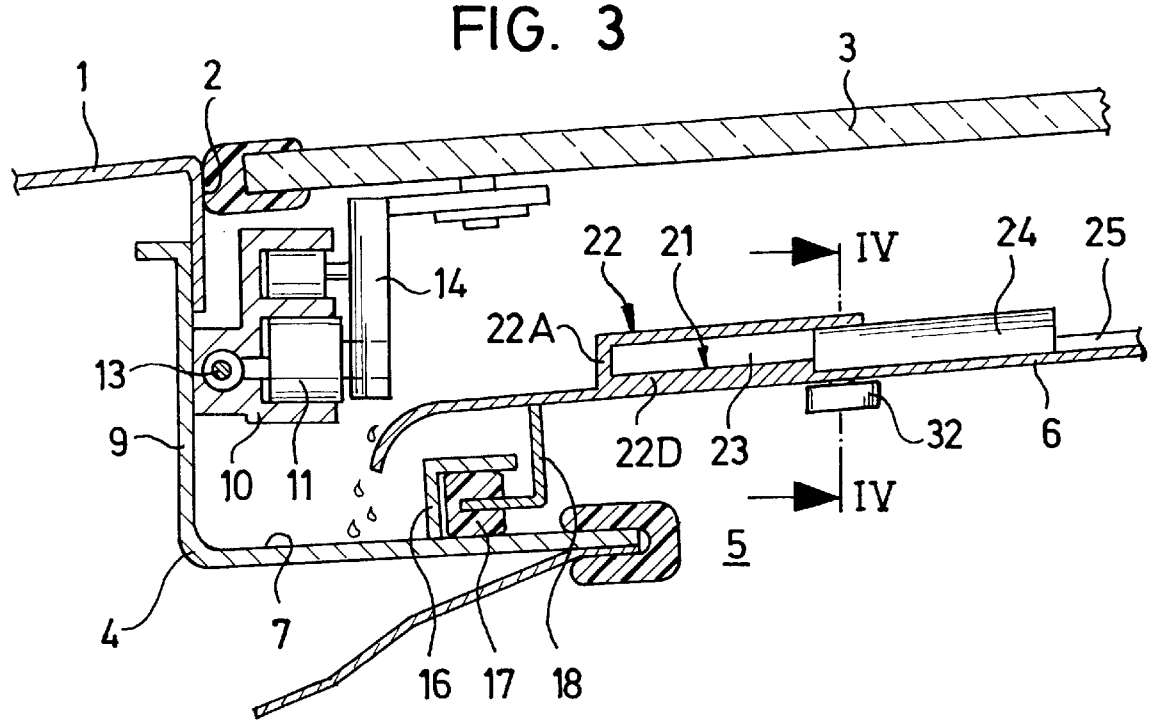
FIG. 3 is a partial cross-sectional view taken along line III—III in FIG. 1, illustrating a first embodiment of a roof in accordance with the present invention and having manually closable ventilation openings.
Figure 4:
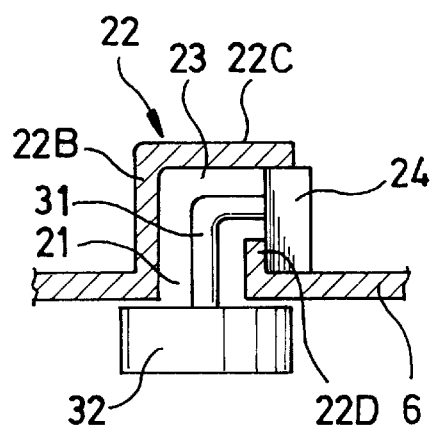
FIG. 4 is a partial sectional view taken along line IV—IV in FIG. 3.

In accordance with another embodiment of the invention, depicted in FIGS. 3 and 4, slots 23 can be closed and selectively, at least partially opened by movable parts formed, for example, by sliders 24. To this end, sliders 24 are arranged in front of wall 22D of each scoop member 22 in such a way that they can completely close-off slots 23. On the other hand, at least partial exposure of slots 23 is possible by sliding elements 24 in a direction which is transverse to the drive direction. In accordance with a first embodiment, slide levers 31, at the rear side of sliders 24, are arranged as actuating means for slide elements 24. Levers 31 extend through the ventilation openings 21 where they are connected with actuating elements 32 that are slidably arranged below the ventilation openings 21 at the underside of liner 6. By means of slide rods 25, each slide element 24 is connected with a like slide element 24, adjacent thereto, so that there is simultaneous actuation of at least one row of slide elements 24, in a direction which is transverse to the drive direction, via a single actuating element 32. With the application of additional sliding rods 25 extending in longitudinal drive direction, it is even possible to effect simultaneous actuation of several rows of slide elements 24 with a single actuation element 32 via the resulting lattice of longitudinal and transverse rods 25. A rearward orientation of slots 23, relative to a forward drive direction, ensures that inflow and outflow ventilation of the inside compartment occurs through ventilation openings 21 in a draft-free manner, even when the cover is completely open. As can be seen from FIG. 4, the upper cover surface 22C of each scoop-element 22 extends to the rear beyond the vertical plane of slot 23, so that it covers slot 23 from above, thus preventing penetration water from above into the inside compartment through ventilation openings 21, even when slide elements 24 are completely open.

Figure 5:
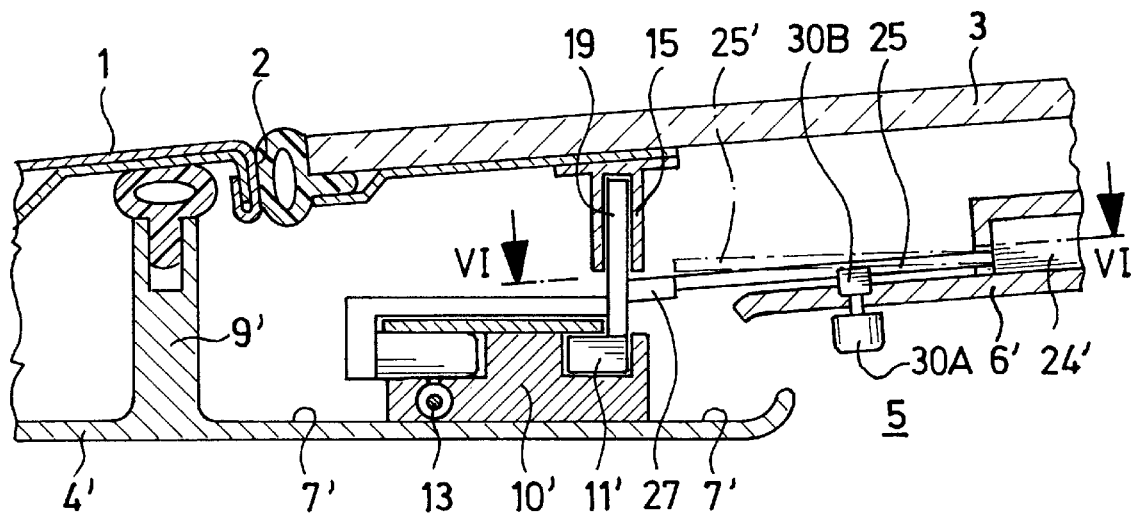
FIG. 5 is a partial cross-sectional view taken along line V—V in FIG. 1, illustrating a second embodiment of a roof in accordance with the present invention and having ventilation openings which can be automatically opening.
Figure 6:
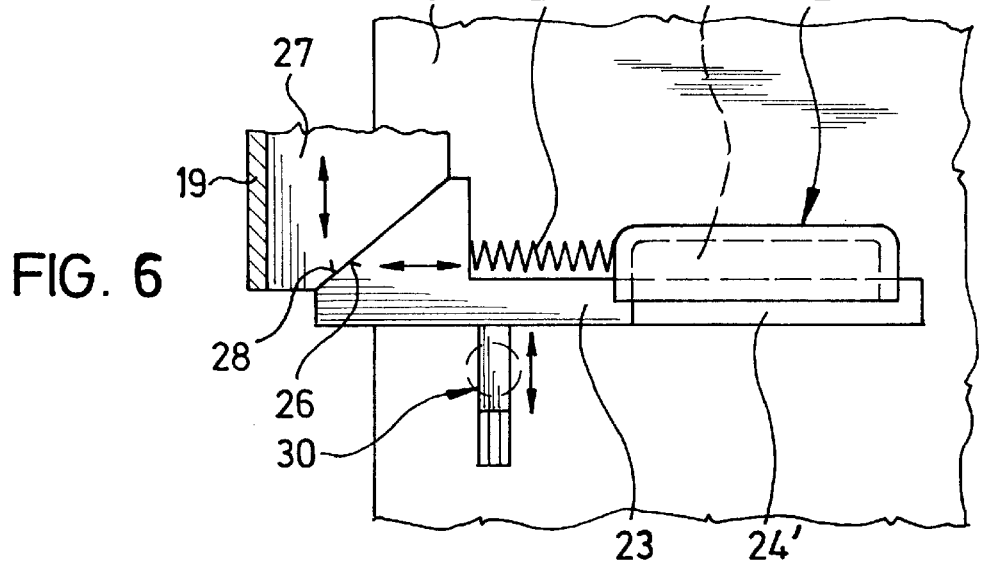
FIG. 6 is a partial top view of the second depicted embodiment taken along line VI—VI in FIG. 5.

In an alternative embodiment, in accordance with FIGS. 5 & 6, in which like or similar parts have the same reference numeral, with an added prime symbol ('), it is provided that sliders 24' are positively coupled with a mechanism of cover 3, and that, preferably, they are automatically activated upon an opening movement of cover 3 raising the coverts rear edge. To this end, each of the slide rods 25', projecting above frame opening 5, have a wedge-shaped surface 26 which cooperates with a reversely inclined wedge-shaped surface 28 of a cam 27. Cams 27 are fixedly coupled with link 19 supported on rear slide elements 11' and which, by way of pins (not depicted in detail) which engage link slots (not depicted) is connected with the cover support 15 attached to cover 3. When slide elements 11' are displaced by way of drive cable 13 for the purpose of lifting the rear edge of cover 3, link 19 is moved by a certain amount to the front. Simultaneously, wedge-shaped surface 28 of cam 27, coupled to link 19, presses slide 25 inwardly via wedge-shaped surface 26, which causes slider 24' to automatically, partially expose slot 23 in scoop shaped element 22, thereby opening ventilation opening 21. The movements of cover 3 and slider 24' thereby are coupled in such a manner that a complete extension of the cover 3 rear edge results in slots 23 being completely exposed. Spring 29, disposed between scoop element 22 and the wedge-shaped end of slide rod 25, produces a return movement of slide rod 25, simultaneously with a reverse movement of slide element 11' lowering movement of the rear edge of cover 3, thereby closing slots 23 by means of slider 24'.

The automatic coupling of an opening of the ventilation slots with the raising of the rear edge of cover 3, thereby corresponds to the desire of the operator to obtain an increased air flow rate with such extension of the cover's rear edge. If, under certain circumstances, this is not desirable, and/or is due to an increased sensitivity of the vehicle passengers, the operator can eliminate the automatic opening of slots 23 by means of coupling 30. Coupling 30 consists of a control unit 30A that is accessible from the inside of liner 6', which is connected with a vertically wedge-shaped locking bolt 30B, and which is longitudinally displaceable by means of a slot extending longitudinally in liner 6' in proximity to its outer edge. With rearward displacement of control element 30A of coupling 30, the wedge-shape of locking bolt 30B engages the elastically formed outer end of slide rod 25 from below and flexes it upwardly to such a degree that the wedge-shaped surface 26 is out of alignment with cam 27 so as not to engage its wedge-shaped surface 28. The wedging of locking bolt 30B with the elastically flexed ends of slide rods 25 results in a simultaneous arrest of sliders 24' in whatever position they are in at the time of locking. Such locking can selectively occur in any position of sliders 24', so that the operator has the ability to firmly lock-in any intermediate position deemed advantageous. The raised position of slide rod 25 is depicted in FIG. 5 by dashed lines and is designated with numeral 25' and the position of coupling 30 for producing this raised position is shown in FIG. 6.

The vehicle roof of the invention provides a wide spectrum of variations regarding light and air transmission into a vehicle roof. The arrangement is of particular advantage when applied to a transparent liner in connection with an opaque cover 3, which, as described, is designed either as a solar cover, or alternatively, as a sheet metal cover.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We Claim:

1. Vehicle roof having a movable cover which selectively closes and at least partially exposes a roof opening in a fixed vehicle surface and having a liner slidably arranged below the movable cover, the liner being stationary and slidable independent of any movement of the movable cover and being formed of a waterproof transparent material; wherein the liner has ventilation openings formed in it which constitute a means for enabling a flow of air from below the liner to an area above the movable cover in a closed position of the liner with said movable cover at least partially open, and wherein a respective means for preventing penetration of water through the ventilation openings while permitting said flow of air therethrough is provided for each of said ventilation openings; wherein movable parts are provided for opening and closing the ventilation openings; and wherein means for moving the movable parts upon opening of the movable cover is provided.

2. Vehicle roof according to claim 1, wherein the means for moving the movable parts comprises a movement mechanism of the cover.

3. Vehicle roof according to claim 2, wherein a manually actuated coupling is provided as a means to switch-on and switch-off said means for moving the movable parts.

4. Vehicle roof according to claim 3, wherein the means for moving are arranged above an upper surface of the liner.

5. Vehicle roof according to claim 1, wherein the means for moving are arranged above an upper surface of the liner.

6. Vehicle roof having a movable cover which selectively closes and at least partially exposes a roof opening in a fixed vehicle surface and having a liner slidably arranged below the movable covers the liner being formed of a waterproof transparent material, wherein the liner has ventilation openings formed in it and means for preventing penetration of water through the ventilation openings; wherein movable parts are provided for opening and closing the ventilation openings; and wherein means for moving the movable parts for opening and closing of the ventilation openings extend through the ventilation openings.

7. Vehicle roof according to claim 1, wherein said means for preventing penetration of water through the ventilation openings comprises the ventilation openings being enclosed at an upper side of the liner except for slots which have lower edge arranged above an upper surface of the liner.

8. Vehicle roof according to claim 7, wherein the slots face toward the rear relative to a longitudinal axis of the roof.

9. Vehicle roof according to claim 1, wherein said means for preventing penetration of water through the ventilation openings comprises the ventilation openings being enclosed at an upper side of the liner except for slots which have lower edge arranged above an upper surface of the liner.

10. Vehicle roof according to claim 9, wherein the slots face toward the rear relative to a longitudinal axis of the roof.

11. Vehicle roof having a movable cover which selectively closes and at least partially exposes a roof opening in a fixed vehicle surface and having a liner slidably arranged below the movable cover, the liner being formed of a waterproof transparent material; wherein the liner has ventilation openings formed in it and means for preventing penetration of water through the ventilation openings; wherein movable parts are provided for opening and closing the ventilation openings; wherein means for moving the movable parts upon opening of the movable cover is provided; wherein the means for moving the movable parts comprises a movement mechanism of the cover; wherein a manually actuated coupling is provided as a means to switch-on and switch-off said means for moving the movable parts; wherein the means for moving the movable parts comprises a wedge-shaped cam member carried by the movement mechanism of the cover and a complementarily wedge-shaped member connected to said movable parts; and wherein said manually actuated coupling comprises means for moving said complementarily wedge-shaped member into and out of alignment with said wedge-shaped cam member.

12. Vehicle roof according to claim 1, wherein said cover is opaque.

* * * * *